United States Patent
Mukasa et al.

[11] Patent Number: 6,031,955
[45] Date of Patent: Feb. 29, 2000

[54] DISPERSION COMPENSATING OPTICAL FIBER

[75] Inventors: Kazunori Mukasa, Ichihara; Yoshihisa Suzuki, Funabashi, both of Japan

[73] Assignee: The Furukawa Electric Co., Ltd., Tokyo, Japan

[21] Appl. No.: 09/037,846

[22] Filed: Mar. 10, 1998

[30] Foreign Application Priority Data

Mar. 11, 1997 [JP] Japan .................................... 9-074423

[51] Int. Cl.[7] .................................................. G02B 6/10
[52] U.S. Cl. ......................................... 385/123; 385/127
[58] Field of Search .............................. 385/24, 123, 127

[56] References Cited

U.S. PATENT DOCUMENTS

| | | | |
|---|---|---|---|
| 5,371,815 | 12/1994 | Poole | 385/28 |
| 5,568,583 | 10/1996 | Akasaka et al. | 385/123 |
| 5,673,354 | 9/1997 | Akasaka et al. | 385/127 |
| 5,802,234 | 9/1998 | Vengsarkar et al. | 385/123 |

FOREIGN PATENT DOCUMENTS

| | | |
|---|---|---|
| 62-215207 | 9/1987 | Japan . |
| 63-208005 | 8/1988 | Japan . |
| 8-313750 | 11/1996 | Japan . |

OTHER PUBLICATIONS

"Dispersion–compensating single–mode fibers: efficient designs for first–and second–order compensation" A.M. Vengsarkar and W.A. Reed *Optics Letters,* Jun. 1, 1993, No. 11, pp. 924–926.

*Primary Examiner*—Hung N. Ngo
*Attorney, Agent, or Firm*—Larcasse & Associates; Randy W. Lacasse; Wesley L. Strickland

[57] ABSTRACT

The present invention provides a dispersion compensating optical fiber, connected to a transmission single-mode optical fiber having zero dispersion in a 1.3-$\mu$m wavelength band, for efficiently compensating for the dispersion of a light signal of a 1.55-$\mu$m wavelength band. The refractive index configuration is such that the refractive index profile is a W type and that the dispersion value is a high negative value of not more than −80. The ratio Ra (Ra=a/b) of the diameter a of a core 1 and the diameter b of a side core 2 is set within a range of not less than 0.33 and not more than 0.37. The ratio DPS(SMF)/DPS(DCF) of a value DPS(SMF) obtained by dividing the dispersion value of the transmission single-mode optical fiber in the 1.55-$\mu$m wavelength band by the dispersion slope of the transmission single-mode optical fiber in the 1.55-$\mu$m wavelength to a value DPS (DCF) obtained by dividing the dispersion value of the dispersion compensating optical fiber in the 1.55-$\mu$m wavelength band by the dispersion slope of the dispersion compensating optical fiber in the 1.55 $\mu$m wavelength band is set within a range of not less than 0.95 and not more than 1.05.

2 Claims, 2 Drawing Sheets

DISPERSION COMPENSATING OPTICAL FIBER

FIELD OF THE INVENTION

The present invention relates to a dispersion compensating optical fiber, connected to an existing transmission single-mode optical fiber having zero dispersion in a 1.3 μm wavelength band, for compensating for the dispersion of a light signal of a 1.55 μm wavelength band transmitted through the transmission single-mode optical fiber.

BACKGROUND OF THE INVENTION

As a transmission network for optical communication, a single-mode optical fiber having zero dispersion in a 1.3 μm wavelength band is installed all over the world. Recently, there has been a tendency for the amount of communication information to dramatically increase with the development of the information-oriented society. With the increase of information, the wavelength division multiplex (WDM) transmission has been widely accepted in the field of communication and we have now entered the era of the wavelength division multiplex transmission. The wavelength division multiplex transmission is an optical transmission method suitable for high-capacity high-speed communication because the wavelength for optical communication is not one but is divided into a plurality of wavelengths so that a plurality of light signals are transmitted.

However, the existing transmission single-mode optical fiber having zero dispersion in the 1.3 μm wavelength band is generally great in transmission loss and when the wavelength division multiplex communication is performed by use of the 1.3 μm wavelength band, the wavelength region does not coincide with the 1.55 μm wavelength band which is the gain band of a typical optical amplifier, so that the optical amplifier cannot be used. This is a hindrance to long-distance optical communication. For this reason, recently, the wavelength division multiplex communication in the 1.55 μm wavelength band has been performed by use of the existing transmission single-mode optical fiber having zero dispersion in the 1.3 μm wavelength band.

However, when optical communication is performed in the 1.55 μm wavelength band by use of the transmission single-mode optical fiber having zero dispersion in the 1.3 μm wavelength band, since the existing transmission single-mode optical fiber has positive dispersion and a positive dispersion slope in the 1.55 μm wavelength band, the dispersion of the signal of each wavelength of the wavelength division multiplex transmission increases as the light signal propagates through the transmission single-mode optical fiber, so that signal separation is difficult at the receiving side. As a result, the quality of optical communication degrades and the reliability of optical communication is lost.

Therefore, recently, a dispersion compensating optical fiber has been developed in order to solve this problem. The dispersion compensating optical fiber has negative dispersion and by connecting the dispersion compensating optical fiber to the receiving side of the transmission single-mode optical fiber, the positive dispersion of the light signal propagating through the transmission single-mode optical fiber is abridged by the negative dispersion of the dispersion compensating optical fiber, so that the dispersion of the light signal is substantially close to zero when the light signal is received at the receiving side. Thus, by connecting the dispersion compensating optical fiber to the transmission single-mode optical fiber, it becomes possible to separate the light signals of wavelength division multiplex transmission at the receiving side and high-capacity high-speed communication of high quality is expected.

As examples of conventional dispersion compensating optical fibers of this type, for example, Japanese Laid-open Patent Publications Nos. Hei-6-11620 and Hei-7-261048 are known. Japanese Laid-open Patent Publication No. Hei-6-11620 proposes that the dispersion and the dispersion slope of the transmission single-mode optical fiber should be simultaneously compensated for. Japanese Laid-open Patent Publication No. Hei-7-261048 shows an example of a distribution of the refractive index of a dispersion compensating optical fiber from which high negative dispersion and a negative dispersion slope are obtained.

In the field of optical communication, for a distribution of the refractive index of the dispersion compensating optical fiber from which high negative dispersion and a negative dispersion slope are obtained, a W type as shown in FIG. 1 is generally proposed as a more suitable one than a matched type as shown in FIG. 3.

OBJECT AND SUMMARY OF THE INVENTION

However, the description of the dispersion compensating optical fiber shown in Japanese Laid-open Patent Publication No. Hei-6-11620 does not include any information on the optimum design of the W-type refractive index profile for the dispersion compensating optical fiber to have a high negative dispersion value and a high compensation rate.

As for the dispersion compensating optical fiber of Japanese Laid-open Patent Publication No. Hei-7-261048, the design data are set with no consideration given to the compensation rate of the transmission single-mode optical fiber having zero dispersion in the 1.3 μm wavelength band and to which the dispersion compensating optical fiber is connected. Therefore, when wavelength division multiplex optical communication is performed in the 1.55 μ-m wavelength band, although a zero dispersion signal can be obtained at the receiving side by compensating for the dispersion for the signal of one of the plural wavelengths, dispersion compensation is not sufficiently performed for the signals of other wavelengths in the vicinity thereof. Thus, the dispersion compensating optical fiber is not satisfactory in either the quality or the reliability of wavelength division multiplex optical communication.

The present invention is made to solve the abovementioned problems, and an object thereof is to provide a dispersion compensating optical fiber capable of sufficiently improving the quality and the reliability of high-capacity high-speed wavelength division multiplex optical communication by ensuring dispersion compensation for each wavelength when the dispersion compensating optical fiber is connected to an existing transmission single-mode optical fiber having zero dispersion in the 1.3 μm wavelength and wavelength division multiplex optical communication is performed in the 1.55 μm wavelength band.

To solve the above-mentioned object, the present invention takes the following measures: According to a first aspect of the invention, in a dispersion compensating optical fiber having a W-type distribution of the refractive index profile in which a side core having a refractive index lower than a refractive index of a center core is disposed so as to surround the center core, a cladding having a refractive index lower than that of the refractive index of the center core but higher than that of the refractive index of the side core is disposed so as to surround the side core and a dispersion value is not more than −80, and used being connected to a transmission single-mode optical fiber having zero dispersion in a 1.3 μm wavelength band, a ratio DPS(SMF)/DPS(DCF) of a value DPS(SMF) obtained by dividing a dispersion value of the transmission single-mode optical fiber in a 1.55 μm wavelength band by a dispersion slope of the transmission single-mode optical fiber in the 1.55 μm wavelength band to a value DPS(DCF) obtained by dividing a dispersion value of the dispersion compensating optical fiber in the 1.55 μm wavelength band by a dispersion slope of the dispersion compensating optical fiber in the 1.55 μm wavelength band is a value within a range of not less than 0.95 and not more than 1.05 by setting a ratio a/b of a diameter a of the center core to a diameter b of the side core within a range of not less than 0.33 and not more than 0.37.

According to a second aspect of the invention, in addition to the features of the first aspect of the invention, a ratio Δ−/Δ+ of a specific refractive index difference Δ− of the side core to the cladding to a specific refractive index difference Δ+ of the center core to the cladding is not more than −0.2 and not less than −0.4, and the specific refractive index difference Δ+ of the center core to the cladding is not less than 1.5% and not more than 2.2%.

In the dispersion compensating optical fiber of the present invention, since the dispersion value is a high negative value of not more than −80, the positive dispersion value which increases as a light signal of the 1.55 μm wavelength band propagates through the transmission single-mode optical fiber is compensated for so as to be substantially zero by a short dispersion compensating optical fiber.

In the dispersion compensation, according to the present invention, since the ratio DPS (SMF) /DPS (DCF) of the value DPS (SMF) obtained by dividing the dispersion value of the transmission single-mode optical fiber in the 1.55 μm wavelength band by the dispersion slope of the transmission single-mode optical fiber in the 1.55 μm wavelength band to the value DPS (DCF) obtained by dividing the dispersion value of the dispersion compensating optical fiber in the 1.55 μm wavelength band by the dispersion slope of the dispersion compensating optical fiber in the 1.55 μm wavelength band is a value within the range of not less than 0.95 and not more than 1.05 by setting the ratio a/b of the diameter a of the center core to the diameter b of the side core within the range of not less than 0.33 and not more than 0.37, the dispersion of the light signal of each wavelength of wavelength division multiplex transmission performed in the 1.55 μm wavelength band which dispersion is caused as the light signal propagates through the transmission single-mode optical fiber is effectively abridged and compensated for by the dispersion compensating optical fiber.

Particularly, since the ratio Δ−/Δ+ of the specific refractive index difference Δ− of the side core to the cladding to the specific refractive index difference Δ+ of the center core to the cladding is not more than −0.2 and not less than −0.4, it is ensured that the ratio DPS(SMF)/DPS(DCF) falls within the range of not less than 0.95 and not more than 1.05, so that the dispersion compensation of each wavelength of the wavelength division multiplex transmission in the 1.55 μm wavelength band is ensured. As a result, the reliability of the dispersion compensation is improved. Since the specific refractive index difference Δ+ of the center core to the cladding is not less than 1.5%, the transmission loss due to a bend of the dispersion compensating optical fiber is reduced and since the specific refractive index difference Δ+ is not more than 2.2%, the light signal propagation condition is sufficiently satisfied. As a result, the dispersion compensation by the dispersion compensating optical fiber is performed under a condition where the function as a light transmission medium is sufficiently satisfied.

Moreover, according to the present invention, since the compensation rate which is the ratio of DPS(SMF) of the transmission single-mode optical fiber in the 1.55 μm wavelength band to DPS(DCF) of the dispersion compensating optical fiber is a value within the range of not less than 0.95 and not more than 1.05 by setting the ratio a/b of the diameter a of the center core and the diameter b of the side core within the range of not less than 0.33 and not more than 0.37 as mentioned above, by connecting the dispersion compensating optical fiber of the present invention to the transmission single-mode optical fiber having zero dispersion in the 1.3 μm wavelength band, the dispersion of the light signal of each wavelength propagating through the transmission single-mode optical fiber is efficiently abridged and compensated for so as to be in a substantially uniform zero dispersion state when wavelength division multiplex optical transmission is performed by use of the 1.55 μm wavelength band. As a result, the quality and the reliability of high-capacity high-speed wavelength division multiplex optical transmission are greatly improved.

Further, since the ratio R Δ® Δ=Δ−/Δ+) of the specific refractive index difference Δ− of the side core to the cladding to the specific refractive index difference Δ+ of the center core to the cladding is not more than −0.2 and not less than −0.4, it is facilitated to surely set Ra within the range of not less than 0.33 and not more than 0.37, so that it is facilitated to set the compensation rate for the transmission single-mode optical fiber within the range of 0.95 to 1.05. As a result, the dispersion compensating optical fiber of the present invention having an excellent compensation rate is easily manufactured and inexpensively provided.

Further, since the specific refractive index difference Δ+ of the center core to the cladding is not less than 1.5% and not more than 2.2%, the transmission loss due to a bend of the dispersion compensating optical fiber is reduced and excellent light signal propagation condition is maintained.

Further, since the dispersion compensating optical fiber of the present invention has a simple refractive index profile configuration and the transmission loss of the light signal is therefore small, the dispersion compensating optical fiber of the present invention is advantageous in long-distance transmission.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which:

FIG. 1 is an explanatory view showing a refractive index configuration of a W-type profile which a dispersion compensating optical fiber of the present invention is provided with;

DETAILED DESCRIPTION OF THE PREFERRED EMBODIMENT

Figure 1:
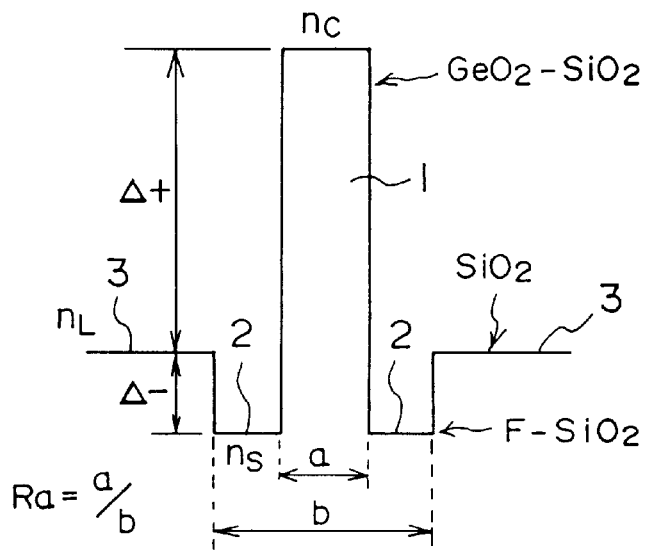

Hereinafter, an embodiment of the present invention will be described with reference to the drawings. FIG. 1 shows the refractive index profile of a dispersion compensating optical fiber of this embodiment. The dispersion compensating optical fiber of this embodiment has a W-type refractive index profile, and a side core 2 is disposed so as to surround a center core 1 and a cladding 3 is disposed so as to surround the side core 2.

The cladding 3 is formed of pure silica ($SiO_2$). The side core 2 comprises a layer ($F-SiO_2$) formed of pure silica doped with fluorine (F) which decreases the refractive index. The core 1 comprises a layer ($GeO\_SiO_2$) formed of pure silica doped with germanium (Ge) which increases the refractive index. That is, a W-type refractive index profile is exhibited in which the refractive index of the side core 2 is lower than the refractive index of the center core 1 and the refractive index of the cladding 3 is lower than the refractive index of the center core 1 but higher than the refractive index of the side core 2.

In this specification, when the diameter of the core 1 is a and the diameter of the side core 2 is b, the ratio of a to b is defined as Ra:

$$Ra = a/b \qquad (1)$$

When the refractive index of the core 1 is nC, the refractive index of the side core 2 is nS and the refractive index of the cladding 3 is nL, the specific refractive index difference Δ+ of the core 1 to the cladding 3 (hereinafter, referred to as core specific refractive index difference ) and the specific refractive index difference Δ− of the side core 2 to the cladding 3 (hereinafter, referred to as side core specific refractive index difference) are defined as follows:

$$\Delta+ = \{(nC^2 nL - nL^2)/2nC^2\} \times 100 \qquad (2)$$

$$\Delta- = \{(nS^2 - nL^2)/2ns^2\} \times 100 \qquad (3)$$

The ratio of the side core specific refractive index difference Δ− to the center core specific refractive index difference Δ+ is defined as R Δ:

$$R\,\Delta = \Delta-/\Delta+ \qquad (4)$$

When the dispersion of the transmission single-mode optical fiber is represented as D(SMF), the dispersion slope of the transmission single-mode optical fiber is represented as SL(SMF), the dispersion of the dispersion compensating optical fiber is represented as D(DCF) and the dispersion slope of the dispersion compensating optical fiber is represented as SL(DCF), the value obtained by dividing the dispersion of the transmission single-mode optical fiber by the dispersion slope of the transmission single-mode optical fiber is represented as DPS(SMF) and the value obtained by dividing the dispersion of the dispersion compensating optical fiber by the dispersion slope of the dispersion compensating optical fiber is represented as DPS(DCF):

$$DPS(SMF) = D(SMF)/SL(SMF) \qquad (5)$$

$$DPS(DCF) = D(DCF)/SL(DCF) \qquad (6)$$

The dispersion compensation rate for the transmission single-mode optical fiber is defined as follows:

$$\text{Compensation rate} = \{SL(DCF)/SL(SMF)\}/\{D(DCF)/D(SMF)\} \qquad (7)$$

The expression (7) can be expressed as the following expression (8) by use of DPS:

$$\text{Compensation rate} = DPS(SMF)/DPS(DCF) \qquad (8)$$

Figure 4:
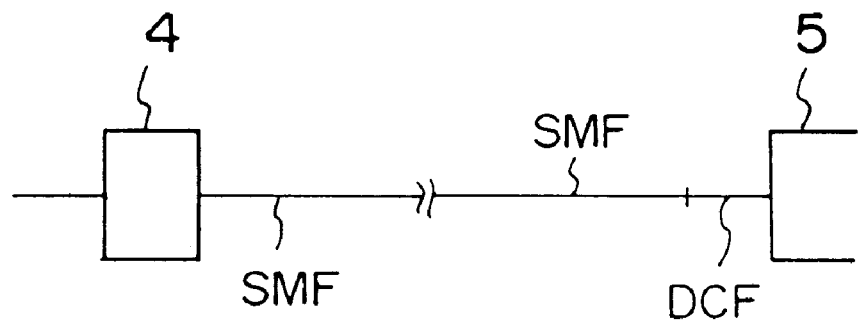
FIG. 4 is an explanatory view showing a transmission network in which the dispersion of a wavelength division multiplex optical communication signal of the 1.55 μm wavelength band is compensated for by connecting a dispersion compensating optical fiber DCF to a transmission single-mode optical fiber SMF having zero dispersion in the 1.3 μm wavelength band.

As shown in FIG. 4, the dispersion compensating optical fiber DCF of this embodiment is used being connected to the receiving side of the existing transmission single-mode optical fiber SMF having zero dispersion in the 1.3 $\mu$m wavelength band. In FIG. 4, reference numeral 4 represents an optical amplifier and reference numeral 5 represents a station of the receiving side. When wavelength division multiplex transmission is performed in the 1.55 $\mu$m wavelength band by use of a transmission network as shown in FIG. 4, in order to substantially uniformly compensate for the dispersion of each wavelength propagating through the transmission single-mode optical fiber SMF so as to be zero, it is important that the compensation rate is 1.0, in other words, that the DPS(SMF) of the transmission single-mode optical fiber and DPS(DCF) of the dispersion compensating optical fiber are set to substantially the same value. The inventors directed their attention to this point and have formed a refractive index profile of the dispersion compensating optical fiber in order that the compensation rate is substantially not less than 0.95 and not more than 1.05.

In this embodiment, in order that the dispersion of the transmission optical fiber is compensated for by a short dispersion compensating optical fiber, the refractive index profile is a W-type profile, the specific refractive index difference Δ+ of the center core 1 is not less than 1.5% and not more than 2.2%, the specific refractive index difference Δ− of the side core is not more than −0.4% and not less than −0.65% and under these conditions, the optimum range of Ra for the compensation rate to be not less than 0.95 and not more than 1.05 is obtained through a simulation so that the dispersion compensating optical fiber has a high negative dispersion of not more than −80.

The reason why the core specific refractive index difference Δ+ is set within the range of 1.5% to 2.2% is that in view of the fact that the transmission loss due to a bend of the optical fiber increases when Δ+ is less than 1.5%, Δ+ is set within the range of not less than 1.5% where the transmission loss due to a bend is small and in view of the fact that the light signal propagation condition deteriorates when Δ+ exceeds 2.2%, the upper limit of the range of Δ+ is set to 2.2% in order to avoid the deterioration. Moreover, in view of the easiness of manufacture of the optical fiber and the light shutting-in effect, the side core specific refractive index difference Δ− is set within the range of not more than −0.4% and not less than −0.65% where both are satisfied.

Figure 2:
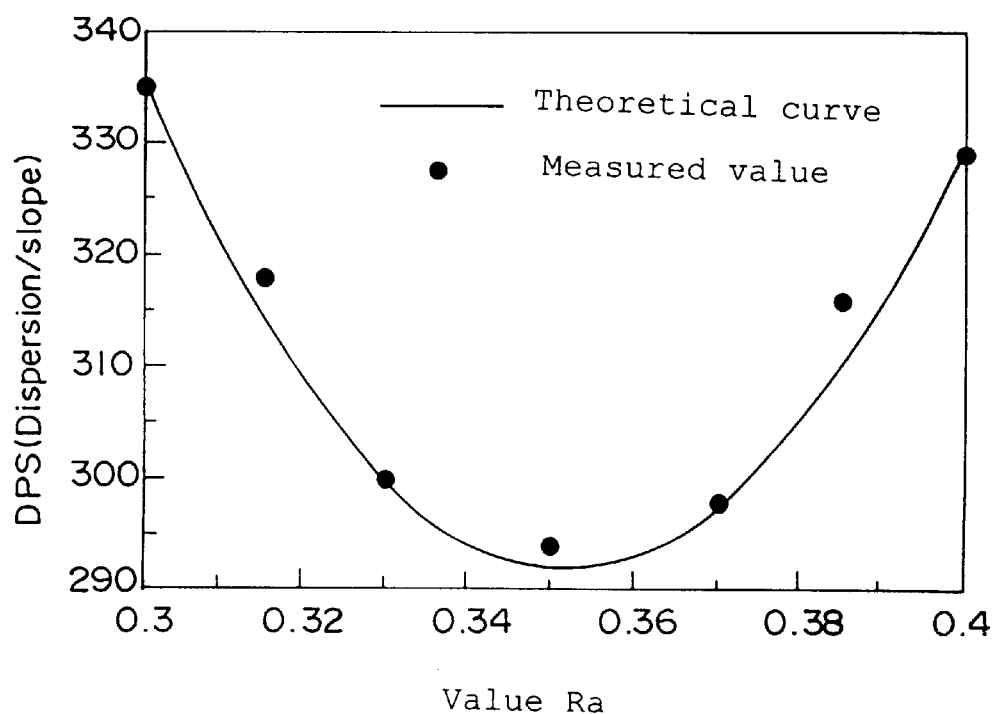
FIG. 2 is a graph showing a relationship between simulation characteristics and measured values of DPS(DCF) in the embodiment.

FIG. 2 shows values of DPS(DCF) of the dispersion compensating optical fiber when the value of Ra is varied under a condition where the core specific refractive index difference Δ+ is limited to a value within the range of not less than 1.5% and not more than 2.2% and the side core specific refractive index difference Δ− is limited to a value within the range of not more than −0.4% and not less than −0.65%. The solid curve represents a theoretical curve of the simulation.

Specifically, for each value of Ra, Δ+ and Δ− are combined in ten ways within the above-mentioned ranges of Δ+ and Δ−, and the average value of the ten combinations is set as DPS(DCF) of the value of Ra. The values of DPS(DCF) of the values of Ra are connected by a solid line to form the theoretical curve. As is apparent from the result of the simulation, when the value of Ra is within the range of 0.33 to 0.37, the value of DCP(DCF) is substantially close to 285 which is the value of DPS(SMF) of the transmission single mode optical fiber SMF. That is, it is understood that by setting the value of Ra within the range of 0.33 to 0.37, the value of DPS(DCF) of the dispersion compensating optical fiber substantially coincides with 285 which is the value of DPS(SMF) of the transmission single-mode optical fiber and consequently, the compensation rate falls within the range of 0.95 to 1.05, so that for each wavelength of wavelength division multiplex transmission performed in the 1.55 μm wavelength band, the dispersion of the light signal propagating through the transmission single-mode optical fiber is abridged and compensated for so as to be substantially zero.

While the graph shown in FIG. 2 is data where the value of R Δ is fixed to substantially-0.3, it has been demonstrated that when R Δ is varied within a range of not more than −0.2 and not less than −0.4, similar results are obtained and when Ra is in the range of 0.33 to 0.37, the value of DPS(DCF) substantially coincides with the value of DPS(SMF) of the transmission single-mode optical fiber and consequently, the compensation rate falls within the range of 0.95 to 1.05. When R Δ falls outside the above-mentioned range of R Δ (not more than −0.2 and not less than −0.4), it is difficult for the compensation rate to be within the range of 0.95 to 1.05. Therefore, in order to ensure that the compensation rate is within the range of 0.95 to 1.05, it is necessary for R Δ to be within the range of not more than −0.2 and not less than −0.4.

According to this embodiment, since the refractive index profile of the dispersion compensating optical fiber is a W-type profile, the center core specific refractive index difference is 1.5% to 2.2% and the side core specific refractive index difference is −0.4% to −0.65%, high negative dispersion is obtained, so that the dispersion of the signal propagating through the transmission single-mode optical fiber SMF cab be abridged and compensated for by a short dispersion compensating optical fiber.

Moreover, since the center core specific refractive index difference Δ+ is set within the range of not less than 1.5% and not more than 2.2%, the transmission loss due to a bend of the optical fiber is reduced and excellent light signal propagation condition is maintained.

Further, since the side core specific refractive index difference is set within the range of −0.4% to −0.65%, the optical fiber is easy to manufacture and the light shutting-up effect is great, so that excellent light signal propagating performance is delivered.

Further, since the value of Ra is set within the range of not less than 0.33 and not more than 0.37, DPS(SMF) of the transmission single-mode optical fiber and DPS(DCF) of the dispersion compensating optical fiber substantially coincide with each other and consequently, the compensation rate falls within the range of 0.95 to 1.05, so that when wavelength division multiplex transmission is performed in the 1.55 μm wavelength band by use of the existing transmission single-mode optical fiber having zero dispersion in the 1.3 μm wavelength band, the dispersion of the light signal of each wavelength propagating through the transmission single-mode optical fiber is compensated for so as to be substantially zero. As a result, the quality and the reliability of high-capacity high-speed wavelength division multiplex optical communication are greatly improved.

Next, a more concrete embodiment of the present invention will be described. Based on the simulation shown in FIG. 2, dispersion compensating optical fibers having different values of Ra where R Δ was set to −0.3, Δ+ was fixed to 2.0% and Δ− was fixed to −0.57% were actually produced on an experimental basis, and the values of DPS(DCF) of the dispersion compensating optical fibers having different values of Ra were plotted as black dots on the graph of FIG. 2.

As a result, the measured values of DPS(DCF) corresponding to the values of Ra are on the theoretical curve of the simulation. Thus the correctness of the simulation has been confirmed.

Moreover, the inventors produced dispersion compensating optical fibers of wider ranges and compared the results of the measurement data. Table 1 shows an example thereof.

TABLE 1

| | Refrac. index profile | Ra | Dispersion (Wavelength 1.55 μm) (ps/nm/km) | Dispersion slope (ps/nm$^2$/km) | DPS (nm) | Comp. rate (%) |
|---|---|---|---|---|---|---|
| 1st embod. | W | 0.34 | −80.446 | −0.2761 | 291.36 | 97.8% |
| 2nd embod. | W | 0.36 | −83.131 | −0.2835 | 293.23 | 97.2% |
| 1st comp. ex. | W | 0.28 | −68.218 | −0.1986 | 343.49 | 83.0% |
| 2nd comp. ex. | W | 0.45 | −121.220 | −0.3518 | 344.57 | 82.7% |
| 3rd comp. ex. | M | — | −68.894 | 0.0192 | −3588.23 | −7.9% |

Figure 3:
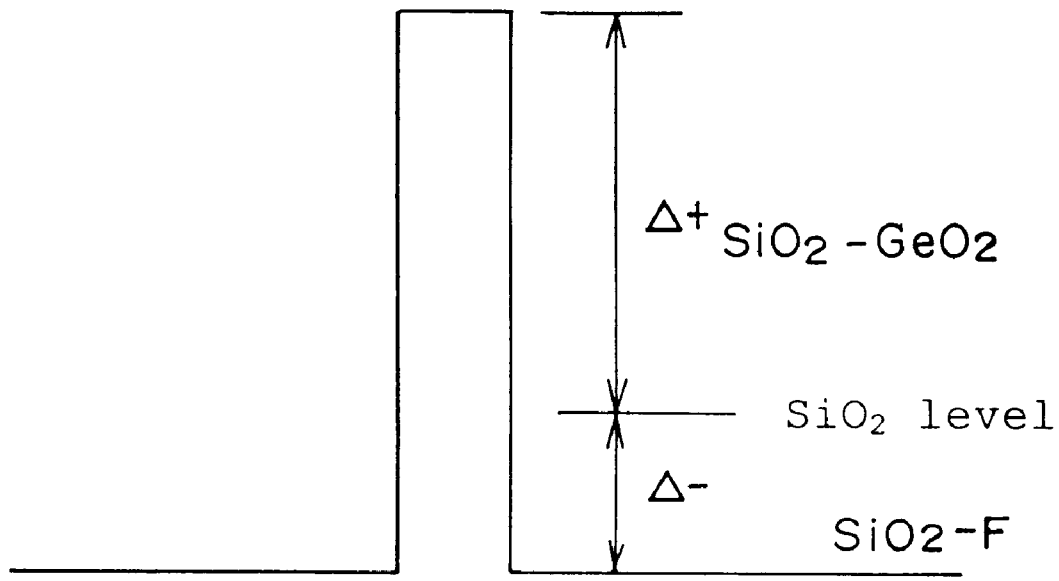
FIG. 3 is a view showing a matched-type refractive index profile of optical fibers.

In Table 1, the first and second embodiments are dispersion compensating optical fibers having the refractive index profile of the present invention and the first to third comparative examples are optical fibers having different refractive index configuration conditions from the present invention. The dispersion compensating optical fibers of the first and second embodiments have different values of Ra and satisfy other conditions, i.e. the condition of R Δ (not more than −0.2 and not less than −0.4) and the condition of the center core specific refractive index difference Δ+ (not less than 1.5% and not more than 2.5%). Needless to say, the side core specific refractive index difference Δ− falls within the range of −0.4% to −0.65%. In the refractive index profile column of Table 1, W represents the W-type profile and M represents the matched-type profile as shown in FIG. 3. The dispersion is obtained for a light signal with a wavelength of 1.55 μm. The dispersion slope is represented as the average value in the 1.55 μm wavelength band. DPS represents DPS(DCF) of the dispersion compensating optical fiber.

As is apparent from the measurement data of Table 1, since the values of Ra of the dispersion compensating optical fibers of the first and second embodiments are both set within the range of 0.33 to 0.37, the values of DPS(DCF) thereof are close to 285 which is the value of the transmission single-mode optical fiber, so that the compensation rate falls within the range of 0.95 to 1.05. As a result, high negative dispersion values and high compensation rates are obtained.

The present invention is not limited to the above-described embodiments but is capable of various other embodiments. For example, while the cladding 3 is formed of pure silica in the refractive index profile shown in FIG. 1, the cladding 3 may be formed of pure silica doped with a dopant such as fluorine (F).

What we claim is:

1. A dispersion compensating optical fiber having a W-type refractive index profile in which a side core having a refractive index lower than a refractive index of a center core is disposed so as to surround the center core, a cladding having a refractive index lower than the refractive index of the center core but higher than the refractive index of the side core is disposed so as to surround the side core and a dispersion value is not more than −80, said dispersion compensating optical fiber being connected to a transmission single-mode optical fiber having zero dispersion in a 1.3 μm wavelength band, wherein a ratio DPS(SMF)/DPS(DCF) is a value within a range of not less than 0.95 and not more than 1.05 by setting a ratio a/b of a diameter a of the center core to a diameter b of the side core within a range of not less than 0.33 and not more than 0.37, wherein a value DPS(SMF) is obtained by dividing a dispersion value of the transmission single-mode optical fiber in a 1.55 μm wavelength band by a dispersion slope of the transmission single-mode optical fiber in the 1.55 μm wavelength band, and wherein a value DPS(DCF) is obtained by dividing a dispersion value of the dispersion compensating optical fiber in the 1.55 μm wavelength band by a dispersion slope of the dispersion compensating optical fiber in the 1.55 μm wavelength band.

2. A dispersion compensating optical fiber according to claim 1, wherein a ratio Δ−/Δ+ of a specific refractive index difference Δ− of the side core to the cladding to a specific refractive index difference Δ+ of the center core to the cladding is not more than −0.2 and not less than −0.4, and the specific refractive index difference Δ+ of the center core to the cladding is not less than 1.5% and not more than 2.2%.

* * * * *

UNITED STATES PATENT AND TRADEMARK OFFICE
CERTIFICATE OF CORRECTION

PATENT NO. : 6,031,955
DATED : Feb. 29, 2000
INVENTOR(S) : Mukasa et al

It is certified that error appears in the above-identified patent and that said Letters Patent is hereby corrected as shown below:

Column 2, line 37, "1.55 µ-m" should read --1.55 µm--;

Column 4, line 21, "the ratio R Δ® Δ=Δ-/Δ+)" should read --the ratio R Δ(R Δ=Δ-/Δ+)--; and, Column 5, line 15, "a layer (GeO_SiO$_2$)" should read --a layer (GeO$_2$-SiO$_2$)--.

Signed and Sealed this

Eighth Day of May, 2001

*Attest:*

NICHOLAS P. GODICI

*Attesting Officer*   *Acting Director of the United States Patent and Trademark Office*